United States Patent [19]

Marchant et al.

[11] 4,140,931
[45] Feb. 20, 1979

[54] MAGNETOHYDRODYNAMIC GENERATOR ELECTRODE

[75] Inventors: David D. Marchant, Richland, Wash.; Don H. Killpatrick, Orland Park, Ill.; Harold Herman, Park Forest, Ill.; Kenneth D. Kuczen, Berkeley, Ill.

[73] Assignee: The United States of America as represented by the United States Department of Energy, Washington, D.C.

[21] Appl. No.: 822,971

[22] Filed: Aug. 8, 1977

[51] Int. Cl.$^2$ ............................................. H02N 4/02
[52] U.S. Cl. .................................................... 310/11
[58] Field of Search .......................................... 310/11

[56] References Cited

U.S. PATENT DOCUMENTS

| | | | |
|---|---|---|---|
| 3,149,253 | 9/1964 | Lucbke ............................ | 310/11 |
| 3,165,652 | 1/1965 | Prater ............................. | 310/11 |
| 3,428,834 | 2/1969 | Yerouchalmi .................... | 310/11 |
| 3,430,082 | 2/1969 | Yerouchalmi .................... | 310/11 |
| 3,432,715 | 3/1969 | Yerouchalmi .................... | 310/11 |
| 3,454,798 | 7/1969 | Yerouchalmi .................... | 310/11 |
| 3,479,538 | 11/1969 | Yerouchalmi .................... | 310/11 |
| 3,508,087 | 4/1970 | Millet et al. ..................... | 310/11 |
| 3,531,421 | 9/1970 | Foex et al. ...................... | 310/11 X |
| 4,045,375 | 8/1977 | Komatu ........................... | 310/10 X |

*Primary Examiner*—Donovan F. Duggan
*Attorney, Agent, or Firm*—Dean E. Carlson; Frank H. Jackson; James W. Weinberger

[57] ABSTRACT

An improved electrode for use as a current collector in the channel of a magnetohydrodynamid (MHD) generator utilizes an elongated monolithic cap of dense refractory material compliantly mounted to the MHD channel frame for collecting the current. The cap has a central longitudinal channel which contains a first layer of porous refractory ceramic as a high-temperature current leadout from the cap and a second layer of resilient wire mesh in contact with the first layer as a low-temperature current leadout between the first layer and the frame. Also described is a monolithic ceramic insulator compliantly mounted to the frame parallel to the electrode by a plurality of flexible metal strips.

8 Claims, 2 Drawing Figures

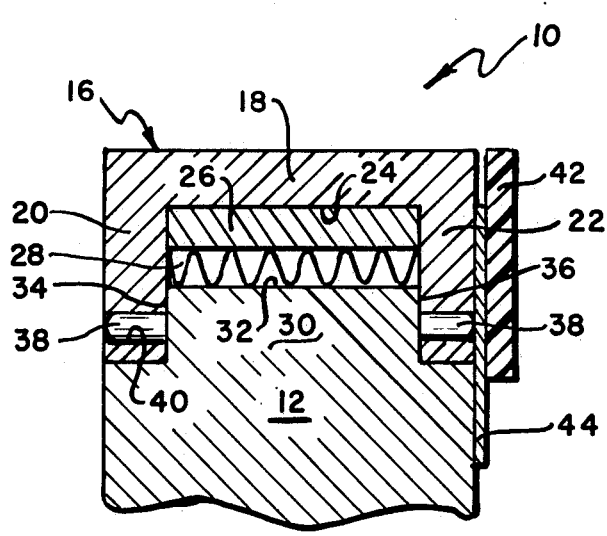
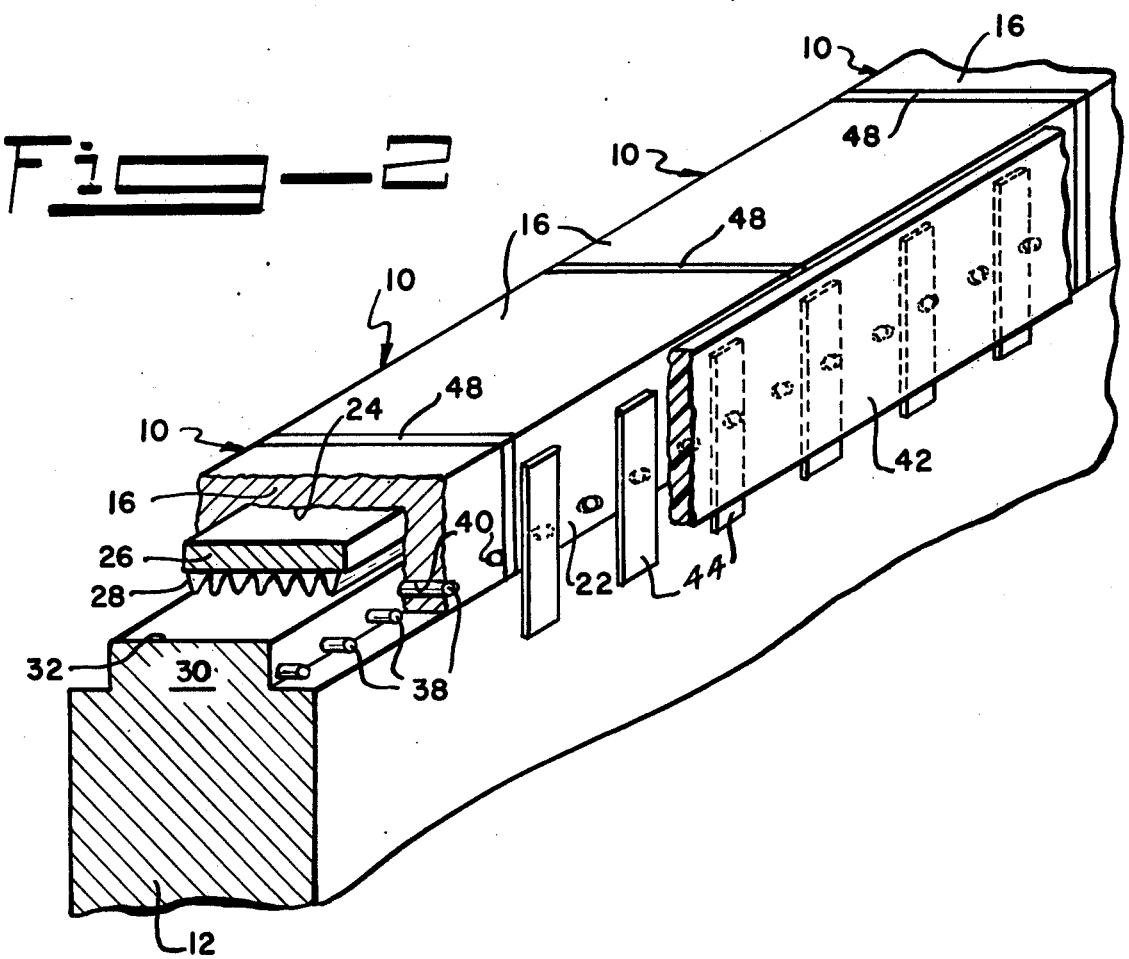

MAGNETOHYDRODYNAMIC GENERATOR ELECTRODE

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to electrodes. More specifically, this invention relates to high-temperature electrodes for use as current collectors in the channel of a magnetohydrodynamic generator.

In a magnetohydrodynamic power generator, heat is utilized to produce a high-velocity stream of electrically conducting fluid or plasma which is passed through a magnetic field to convert the kinetic energy of the stream into electrical energy. A typical diagonal window frame MHD power generator is an elongated duct or channel constructed of a large number of open rectangular frames or "window frames" fastened together side by side, insulated from each other and cooled by a liquid passing through coolant channels in each frame. Around the inner perimeter of each frame are attached, generally by brazing, a number of individual, generally rectangular, electrodes for collecting the electrical current generated in the channel by the passage of the high-temperature conductive fluid through the magnetic field. Other generator geometries can also be used, but, in each case, a number of electrodes are present on each frame mounted end to end and separated from each other by an electrical insulation since some will act as anodes and some as cathodes as the plasma passes through the channel perpendicular to the longitudinal axis of the electrodes.

The environmental conditions within an operating channel in which the electrodes must function are very severe, and strenuous physical demands are placed on these electrodes. The plasma, which may be either an ionized gas or an inert gas seeded with a conductor such as potassium, may reach temperatures up to 2800°, while the surface of the electrode may reach about 2000° C. However, since the window frames to which the electrodes are attached are generally of copper, the electrode-frame temperatures can be no more than about 600–1000° C. Thus, the electrodes must be capable of withstanding a temperature differential between electrode-plasma interface and the electrode-frame interface of up to about 1400° C. Minimizing the temperature differential within the plasma between the plasma core and the electrode-plasma interface increases the energy conversion efficiency. The electrode must be able to withstand erosive forces since the plasma as it passes through the duct may approach or even exceed sonic velocity. The electrode must either be protected from oxidation or be prepared of oxidation-resistant materials since many plasmas, depending upon the particular fluid and its source, are slightly oxidizing at operating temperatures. The electrode must also be able to withstand the effects of potassium at operating temperatures when present as seed material in the fluid. The electrode must be constructed of materials which are electrically conductive at the normal operating temperature of the electrode, which usually requires that the electrode be constructed of several different materials because of the temperature differential through the electrode. Finally, since there is always the possibility of generator malfunction, the electrodes must be able to withstand the thermal shock of sudden heating or cooling without the electrode separating from the channel or without the upper high-temperature erosion-resistant layers spalling from the remainder of the electrode. Thus, it is a problem to find a material or materials and an electrode design from which electrodes can be made which can withstand the rigor of such an environment.

SUMMARY OF THE INVENTION

We have developed an electrode which meets many of the problems enumerated above by providing a dense, monolithic, erosion and corrosion-resistant, high-temperature refractory ceramic cap which contacts the MHD fluid and which can be compliantly mounted on the window frame of the channel to resist spalling and cracking due to thermal shock from temperature excursions within the operating channel. The electrode of our invention consists of an elongated monolithic channel-shaped cap, constructed of a dense refractory ceramic material which is electrically conductive at MHD operating temperatures, the cap having a flat rectangular top and two parallel side walls extending from the top, forming a flat-bottomed central longitudinal groove, each wall having a longitudinal row of mounting openings along the open edge, a first layer of slightly porous refractory ceramic material electrically conductive at temperatures above about 500° C. in the bottom of the groove, as a high-temperature current leadout and a second layer of electrically conductive resilient wire mesh in electrical contact with the first layer as a low-temperature current leadout. The electrode is mounted with the side walls straddling the channel frame, a portion of the inner perimeter of the frame extending part way into the longitudinal groove in electrical contact with the layer of resilient wire mesh. In the preferred form, the inner perimeter of the frame contains a raised longitudinal central mounting ridge having a flat top and perpendicular parallel sides which extends into the longitudinal groove of the electrode so that the ridge top is in electrical contact with the low-temperature current leadout and the side walls of the electrode are even with the sides of the frame. The electrode is held in place on the frame by a plurality of studs attached to the sides of the frame or ridge and extending into each mounting opening in the electrode. By using studs slightly undersize with respect to the diameter of the openings, the electrode is permitted a small amount of compliance with respect to the frame when subjected to thermal or other stress.

An insulator for use with the electrode consists of a rectangular monolithic block of electrically insulative refractory ceramic parallel to the electrode, compliantly attached to the frame by a plurality of vertical, thermally conductive, flexible metal strips attached at the top to the insulator and at the bottom to the frame.

The advantage of the present electrode over prior art electrodes is that it has a monolithic refractory ceramic cap, exposed to the channel environment and compliantly mounted to the channel frame, which physically protects the low-temperature electrode components from the environment and from thermal stress.

It is therefore one object of the invention to provide an improved electrode for use as a current collector in the high-temperature environment of a magnetohydrodynamic generator.

It is another object of the invention to provide an electrode which consists of a dense monolithic refractory ceramic for exposure to the MHD environment.

It is another object of the invention to provide an improved method for compliantly mounting a dense monolithic refractory ceramic electrode in the channel of an MHD generator.

It is still another object of the invention to provide a method for compliantly mounting an insulator in the channel of an MHD generator.

Finally, it is the object of the invention to provide an improved electrode and a method for compliantly mounting the electrode and an insulator in the channel of an MHD generator.

BRIEF DESCRIPTION OF THE DRAWINGS

FIG. 1 is a cross-sectional view of the preferred embodiment of the invention shown mounted on an MHD frame.

FIG. 2 is a perspective view partially cut away showing several electrodes and an insulator mounted on an MHD frame.

DETAILED DESCRIPTION OF THE PREFERRED EMBODIMENT

Referring to FIGS. 1 and 2, the electrode 10, shown mounted on an MHD frame 12, consists of an elongated monolithic cap 16 constructed of a dense ceramic material having a flat rectangular top 18 and two short parallel side walls 20 and 22, respectively, extending downward from the edges of the top rectangle to form a central longitudinal flat-bottomed groove 24. In the bottom of groove 24 in electrical contact with cap 16 is a first layer 26 of slightly porous ceramic material which is electrically conductive at temperatures above 500° C as a high-temperature leadout and a second layer 28 in electrical contact with the first layer 26 of electrically conductive resilient wire mesh as a low-temperature current collector. The inner perimeter of MHD frame 12 has a central raised longitudinal mounting ridge 30 having a flat upper surface 32 and two parallel side walls 34 and 36, respectively, and extends into groove 24 in cap 16 so that surface 32 is in electrical contact with second layer 28. Electrode 10 is retained on frame 12 by a plurality of short mounting studs 38 attached to ridge side walls 34 and 36, which extend into a plurality of mounting openings 40 located in a longitudinal row near the open end of side walls 20 and 22. Preferably, mounting studs 38 are slightly undersize with respect to the diameter of mounting openings 40 to permit a small amount of movement of cap 16 relative to frame 12, resilient second layer 28 maintaining electrical contact between layer 26 and top 32 during any movement. Parallel to electrode 10, even with the top of the electrode and extending downward along one side wall is a monolithic rectangular-shaped electrical insulator 42 which is constructed of a refractory ceramic insulative material. Insulator 42 is attached to the top portion of a plurality of spaced, vertical, flexible, thermally conductive metal strips 44 which extend downward alongside electrode 10 where they are attached to a side wall 46 of frame 12 to permit movement of the insulator relative to the frame. Electrodes 10 are separated from each other by end insulator 48.

It is preferable that surface 32 of ridge 30 and the interface between high and low-temperature current leadouts 26 and 28, respectively, be coated with a layer of electrically conductive metal or metal paste to ensure that electrical conductivity between cap 16 and frame 12 is maintained. This layer may be any highly electrically conductive metal such as silver, platinum, aluminum or copper and, most conveniently to apply, a paste of these metals.

the monolithic refractory ceramic cap material may be any material that is capable of withstanding a temperature of up to about 2200° C. under a partial pressure of oxygen which may be up to $10^{-5}$ atmospheres, is corrosion and erosion-resistant and is electrically conductive at a temperature above about 1200° C. The preferred ceramics include stabilized zirconia and hafnia. It is important that the zirconia and hafnia be at least partially stabilized by the addition of from 1 to 60 mole percent (m/o), generally 5 to 10 m/o, of one or more of the following: yttria, ceria, neodymia, praseodymia, calcium oxide or magnesium oxide to prevent potentially destructive volume changes which accompany crystalline transformation during heating and to improve electrical conductivity. For example, hafnia might contain about 1 to 10 m/o, preferably 8 to 10 m/o, yttria to prevent phase changes, and 2 to 12 m/o, preferably 6 to 10 m/o, ceria to enhance electrically conductivity.

The first layer 26 may be any refractory ceramic material which is thermally conductive and which becomes electrically conductive at temperatures above about 500° C. to function as a high-temperature current leadout from cap 16. Preferred materials are spinel doped with 5 to 40 m/o $Fe_3O_4$ and iron aluminum oxide ($FeAl_2O_4$) doped with 10 to 30 m/o $Fe_3O_4$. Other satisfactory ceramic materials include magnesium chromium spinel ($MgCrO_3$) and strontium or magnesium doped lanthanum chromite ($LaCrO_3$). It is preferred that this material be slightly porous, i.e. 70–85% of theoretical density, so that it will be more compliant during thermal excursions of the MHD channel to prevent separation of the layer from channel 24 of cap 16.

The second or low-temperature leadout layer 28 may be any resilient or compliant electrically conductive wire which will maintain electrical contact between first layer 26 and surface 32 on MHD frame 12 during and after a thermal excursion which may cause movement of the cap relative to the frame. The layer may be a wire mesh, a wire coil or three-dimensional woven wire fabric able to withstand temperatures up to about 700–900° C. without embrittlement and which is preferably nonmagnetic such as stainlss steel, copper and the nickel-based alloys of chromium and molybdenum, such as Hastelloy B ® and X and Inconel 600 ®.

The insulator which will be mounted on only one side of each frame may be any material which is electrically nonconductive at MHD channel operating temperatures, such as magnesia, alumina or magnesia-alumina spinel. Preferably the insulator is a monolithic piece about as long as the electrode and about 50–60 mils in thickness. The insulator is attached by brazing or other means to a plurality of evenly spaced flexible metal strips such as copper which may be 5–10 mils wide and which are in turn attached to the side walls of the frame to provide a flexible insulator mounting.

The electrode of the invention may be prepared by any convenient method. For example, a refractory ceramic cap about 3 inches long and having side walls about 125 mils thick and a top about 30–120 mils thick may be prepared by hot pressing, cold pressing or isostatically pressing and sintering the refractory ceramic material to obtain a shape that is from 90 to 98% of theoretical density. A longitudinal row of mounting holes about 65-70 mils in diameter and about 500 mils on center are then drilled in the cap near the open edge. The high-temperature leadout is provided by plasma spraying a 30-90 mil layer of the material having about 15-30% porosity in the bottom of the channel formed by the cap. A 30-90 mil layer of metal mesh cut to size can then be adhesively applied to the first layer or placed on the raised central portion and the electrode cap placed over the second layer so that the side walls of the cap straddle the central portion which is held in place by a plurality of mounting studs applied to the frame through the mounting holes by resistance welding. By using studs slightly smaller in diameter than the mounting holes, the electrode cap is allowed a small amount of movement or compliance relative to the MHD frame during periods of thermal stress.

The insulator may be perepared, for example, by brazing or otherwise attaching a plurality of thermally conductive metal strips, such as copper about 5-10 mils wide, to a monolithic insulator 50-60 mils in thickness and in turn brazing the strips to the side wall of the frame to provide a compliantly mounted insulator.

As can be seen from the preceding discussion and the drawings, the electrode of the invention provides a single dense monolithic refractory ceramic cap which is best able to withstand the environment conditions within MHD generator channel and still protect the components necessary for electrical conductivity and also provides a method for compliantly mounting the electrode and insulator within the channel so that they are able to withstand thermal stresses generated within the channel better than any rigidly mounted electrode and insulator.

The embodiments of the invention in which an exclusive property or privilege is claimed are defined as follows:

1. An electrode for mounting on a frame of a magnetohydrodynamic generator channel comprising:
    an elongated monolithic cap having a flat rectangular top porton and two parallel side walls extending downward from the top and having an open edge, the walls and top forming a central longitudinal flat-bottomed groove, the walls each having a longitudinal row of mounting holes near the open edge, the cap being constructed of a dense refractory ceramic which is electrically conductive at MHD operating temperature,
    a first layer of porous refractory ceramic material on the bottom of the groove, as a high-temperature current leadout, the porous ceramic being electrically conductive at temperatures above about 500° C., and
    a second layer of electrically conductive resilient material in electrical contact with the first layer as a low-temperature current leadout.

2. The electrode of claim 1 wherein the refractory ceramic cap is 90 to 98% of the theoretical density and is of material selected from the group consisting of stabilized zirconium oxide and stabilized hafnium oxide.

3. The electrode of claim 2 wherein the first layer is 70 to 85% of theoretical density and is of material selected from the group consisting of iron-doped spinel, iron-doped aluminum oxide, magnesium chromite spinel, strontium-doped lanthanum chromite and magnesium-doped lanthanum chromite.

4. The electrode of claim 3 wherein the second layer is of material selected from the group consisting of stainless steel, copper and nickel-based alloys of chromium and molybdenum.

5. The electrode of claim 4 in combination with a magnetohydrodynamic generator channel frame wherein the frame has side walls and an inner perimeter, the inner perimeter having a raised central longitudinal mounting ridge with a flat upper surface and parallel sides, the electrode being mounted on the frame so that the ridge extends part way into the longitudinal groove in electrical contact with the low-temperature leadout, a plurality of short studs attached to the sides of the ridge and extending into each mounting opening in the cap for holding the cap on the frame, the studs being slightly undersize with respect to the diameter of the mounting openings, thereby permitting a small amount of movement of the cap relative to the frame.

6. The combination of claim 5 including a monolithic rectangular electrical insulator parallel to the electrode, the top of the insulator even with the top of the electrode and extending downward along one side of the electrode, including attaching means for compliantly attaching the electrode to the frame.

7. The combination of claim 6 wherein the insulator attaching means consists of a plurality of spaced vertical thermally conductive flexible metal strips having an upper end and a lower end, the upper end being attached to the insulator and the lower end being attached to the side wall of the frame.

8. The combination of claim 6 wherein the refractory ceramic insulator is selected from the group consisting of magnesium oxide, aluminum oxide and magnesia-alumina-spinel.

* * * * *